(12) United States Patent
Liu et al.

(10) Patent No.: US 10,486,211 B2
(45) Date of Patent: Nov. 26, 2019

(54) BLANK WATER BLOWING DEVICE

(71) Applicant: CITIC Dicastal CO., LTD, Qinhuangdao (CN)

(72) Inventors: Weidong Liu, Qinhuangdao (CN); Jiandong Guo, Qinhuangdao (CN); Bowen Xue, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 278 days.

(21) Appl. No.: 15/636,765

(22) Filed: Jun. 29, 2017

(65) Prior Publication Data

US 2018/0001363 A1 Jan. 4, 2018

(30) Foreign Application Priority Data

Jun. 29, 2016 (CN) .......................... 2016 1 0492395

(51) Int. Cl.
*B21B 45/02* (2006.01)
*B29C 35/16* (2006.01)
*B29D 30/06* (2006.01)

(52) U.S. Cl.
CPC ...... *B21B 45/0233* (2013.01); *B21B 45/0272* (2013.01); *B29C 35/16* (2013.01); *B29D 30/0643* (2013.01); *B29C 2035/1616* (2013.01)

(58) Field of Classification Search
CPC .... F26B 9/00; F26B 11/00; F26B 5/00; F26B 21/04; F26B 21/004; F26B 25/003; B21B 45/0233; B21B 45/0272; B29C 35/16; B29C 30/0643
USPC ........................................................... 34/90
See application file for complete search history.

(56) References Cited

U.S. PATENT DOCUMENTS

| | | | | |
|---|---|---|---|---|
| 3,880,020 A * | 4/1975 | Clem | ................... | B21D 28/246 72/324 |
| 6,293,002 B1 * | 9/2001 | Oh | .......................... | B23P 15/26 29/726 |
| 6,920,704 B1 * | 7/2005 | Silverbrook | ........... | B41J 11/002 101/483 |
| 6,944,970 B2 * | 9/2005 | Silverbrook | ........... | B41J 11/002 101/389.1 |
| 10,197,483 B2 * | 2/2019 | Du | ........................... | G01N 3/24 |
| 10,265,823 B2 * | 4/2019 | Xue | ........................ | B24B 5/44 |
| 10,279,432 B2 * | 5/2019 | Luo | ...................... | B23K 26/361 |
| 10,286,508 B2 * | 5/2019 | Zhao | ....................... | B23Q 3/183 |

(Continued)

FOREIGN PATENT DOCUMENTS

DE 4029429 A1 * 3/1992 ......... B21B 15/0042

*Primary Examiner* — Stephen M Gravini
(74) *Attorney, Agent, or Firm* — Maier & Maier, PLLC

(57) ABSTRACT

The present invention provides a blank water blowing device, which is mainly composed of a frame, a lift cylinder, an auxiliary board, guide shafts, linear bearings, bearing seats, a mounting rack, a lifting frame, a thrust cylinder, a linear guide rail, slide rail seats, sliding seats, a sprocket A, chains, sprockets B, a motor, bases, rotating shafts, glands, bearings, powered rollers, conveyor chains, an air supply pipe, air amplifiers, a support, driven rollers, flanges, a ball screw and the like. The blank water blowing device provided by the present invention can meet the requirement of blank water blowing and also has the characteristics of simple structure, convenience in manufacturing, stable performances, and capability of meeting the precision machining requirement.

5 Claims, 1 Drawing Sheet

(56) References Cited

U.S. PATENT DOCUMENTS

| | | | |
|---|---|---|---|
| 2012/0073453 A1* | 3/2012 | Choi | A47J 37/049 |
| | | | 99/443 R |
| 2017/0314346 A1* | 11/2017 | Hou | E21B 15/00 |
| 2018/0001363 A1* | 1/2018 | Liu | B21B 45/0233 |
| 2018/0010851 A1* | 1/2018 | Liu | F26B 11/00 |
| 2018/0128725 A1* | 5/2018 | Du | G01N 3/24 |
| 2019/0126775 A1* | 5/2019 | Han | G05B 19/418 |
| 2019/0157708 A1* | 5/2019 | Mao | H01M 10/0404 |

\* cited by examiner

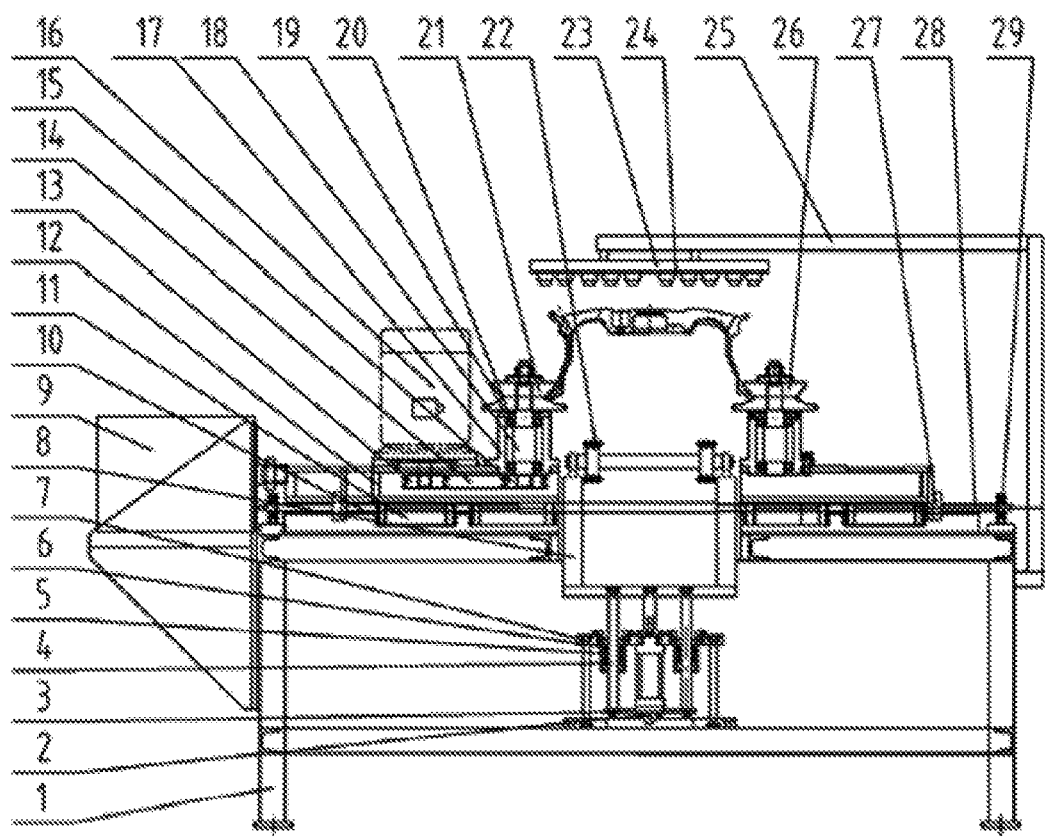

BLANK WATER BLOWING DEVICE

TECHNICAL FIELD

The present invention relates to a machining device, and in particular to a device for removing residual water on a blank through high-pressure air.

BACKGROUND ART

In an automobile wheel machining process, a wheel blank after heat treatment needs to be cooled to below 50 degrees centigrade before starting an X-ray inspection working process, and wheel manufacturing enterprises generally utilize a water cooling mode to cool the wheel blank. However, in order to ensure the accuracy of X-ray inspection, residual water on the front surface of the wheel blank needs to be removed. Therefore, the present invention provides a device for removing the residual water on the blank through high-pressure air.

SUMMARY OF THE INVENTION

An object of the present invention is to provide a blank water blowing device.

To achieve the object described above, a technical solution of the present invention is as follows: a blank water blowing device is composed of a frame, a lift cylinder, an auxiliary board, guide shafts, linear bearings, bearing seats, a mounting rack, a lifting frame, a thrust cylinder, a linear guide rail, slide rail seats, sliding seats, a sprocket A, chains, sprockets B, a motor, bases, rotating shafts, glands, bearings, powered rollers, conveyor chains, an air supply pipe, air amplifiers, a support, driven rollers, flanges, a ball screw and mounting seats. The mounting rack, the linear guide rail, the thrust cylinder, the support and the mounting seats are fixed on the frame, and the air amplifiers are mounted on the support through the air supply pipe. The bearing seats and the lift cylinder are fixed on the mounting rack, the guide shafts are connected with the bearing seats through the linear bearings, an output shaft of the lift cylinder is connected with the lifting frame, and the conveyor chains are mounted on the lifting frame. An output shaft of the thrust cylinder is connected with one of the sliding seats, the sliding seats are connected with the linear guide rail through the slide rail seats, the motor and the bases are fixed on the sliding seats, the rotating shafts are mounted on the bases through the glands and the bearings, two ends of each rotating shaft are respectively connected with the corresponding powered roller and the corresponding sprocket B, an output end of the motor is connected with the sprocket A, the sprocket A and two sprockets B are connected through the chains, the ball screw is mounted on the frame through the left mounting seat and the right mounting seat, and two flanges are respectively fixed on the left sliding seat and the right sliding seat and are meshed with the ball screw.

The lift cylinder can drive the lifting frame and the conveyor chains to move up and down through the guide shafts and the linear bearings.

The motor can drive two powered rollers on the left side to rotate through chain transmission of the sprocket A, the chains and two sprockets B.

The ball screw is a two-way ball screw rotating leftwards and rightwards and having positive and negative threads. Due to matching between the ball screw and the flanges fixed on the left sliding seat and the right sliding seat, the thrust cylinder drives the left sliding seat and the right sliding seat to perform synchronous centripetal motion or centrifugal motion along the linear guide rail, and two powered rollers and two driven rollers implement high-precision centering motion.

The tail ends of four guide shafts are connected with the auxiliary board, thereby ensuring that the lift cylinder can drive the lifting frame and the conveyor chains to smoothly and synchronously move up and down.

During actual use, a blank is conveyed to the blank water blowing device through the conveyor chains, the lift cylinder lifts up the blank to an appointed position, and then, the thrust cylinder starts working. The ball screw is a two-way ball screw rotating leftwards and rightwards and having the positive and negative threads, so, due to the matching between the ball screw and the flanges fixed on the left sliding seat and the right sliding seat, the thrust cylinder drives the left sliding seat and the right sliding seat to perform synchronous centripetal motion along the linear guide rail, two powered rollers and two driven rollers clamp the lip of a blank wheel, and then the blank is located in high precision. The motor drives two powered rollers on the left side to rotate through the chain transmission of the sprocket A, the chains and two sprockets B, and the two powered rollers drive the blank to rotate. The air supply pipe supplies compressed air, the compressed air passes through the air amplifiers to form high-pressure air flows, and the high-pressure air flows blow off residual water on the blank. The thrust cylinder resets, the powered rollers and the driven rollers loosen the blank, the lift cylinder lifts down the blank to reset, and the conveyor chains carry away the water-removed blank. So far, the blank water blowing operation is completed.

The blank water blowing device provided by the present invention can meet the requirement of blank water blowing, and also has the characteristics of simple structure, convenience in manufacturing, stable performances, and capability of meeting the precision machining requirement.

BRIEF DESCRIPTION OF DRAWINGS

FIG. 1 is a structural diagram of a blank water blowing device provided by the present invention.

In the FIGURE, numeric symbols are as follows: 1—frame, 2—lift cylinder, 3—auxiliary board, 4—guide shaft, 5—linear bearing, 6—bearing seat, 7—mounting rack, 8—lifting frame, 9—thrust cylinder, 10—linear guide rail, 11—slide rail seat, 12—sliding seat, 13—sprocket A, 14—chain, 15—sprocket B, 16—motor, 17—base, 18—rotating shaft, 19—gland, 20—bearing, 21—powered roller, 22—conveyor chain, 23—air supply pipe, 24—air amplifier, 25—support, 26—driven roller, 27—flange, 28—ball screw, and 29—mounting seat.

DETAILED DESCRIPTION OF THE INVENTION

In the following, the details and working conditions of a specific device provided by the present invention are described in combination with FIGURES.

A blank water blowing device is composed of a frame 1, a lift cylinder 2, an auxiliary board 3, guide shafts 4, linear bearings 5, bearing seats 6, a mounting rack 7, a lifting frame 8, a thrust cylinder 9, a linear guide rail 10, slide rail seats 11, sliding seats 12, a sprocket A 13, chains 14, sprockets B 15, a motor 16, bases 17, rotating shafts 18, glands 19, bearings 20, powered rollers 21, conveyor chains 22, an air supply pipe 23, air amplifiers 24, a support 25, driven rollers 26, flanges 27, a ball screw 28 and mounting seats 29. The blank water blowing device is characterized in that the mounting rack 7, the linear guide rail 10, the thrust cylinder 9, the support 25 and the mounting seats 29 are fixed on the frame 1, and the air amplifiers 24 are mounted on the support 25 through the air supply pipe 23. The bearing seats 6 and the lift cylinder 2 are fixed on the mounting rack 7, the guide shafts 4 are connected with the bearing seats 6 through the linear bearings 5, an output shaft of the lift cylinder 2 is connected with the lifting frame 8, and the conveyor chains 22 are mounted on the lifting frame 8. An output shaft of the thrust cylinder 9 is connected with one of the sliding seats 12, the sliding seats 12 are connected with the linear guide rail 10 through the slide rail seats 11, the motor 16 and the bases 17 are fixed on the sliding seats 12, the rotating shafts 18 are mounted on the bases 17 through the glands 19 and the bearings 20, two ends of each rotating shaft 18 are respectively connected with the corresponding powered roller 21 and the corresponding sprocket B 15, an output end of the motor 16 is connected with the sprocket A 13, the sprocket A 13 and two sprockets B 15 are connected through the chains 14, the ball screw 28 is mounted on the frame 1 through the left mounting seat 29 and the right mounting seat 29, and two flanges 27 are respectively fixed on the left sliding seat 12 and the right sliding seat 12 and are meshed with the ball screw 28.

The lift cylinder 2 can drive the lifting frame 8 and the conveyor chains 22 to move up and down through the guide shafts 4 and the linear bearings 5.

The motor 16 can drive two powered rollers 21 on the left side to rotate through chain transmission of the sprocket A 13, the chains 14 and two sprockets B 15.

The ball screw 28 is a two-way ball screw rotating leftwards and rightwards and having positive and negative threads. Due to matching between the ball screw 28 and the flanges 27 fixed on the left sliding seat 12 and the right sliding seat 12, the thrust cylinder 9 drives the left sliding seat 12 and the right sliding seat 12 to perform synchronous centripetal motion or centrifugal motion along the linear guide rail 10, and two powered rollers 21 and two driven rollers 26 implement high-precision centering motion.

The tail ends of four guide shafts 4 are connected with the auxiliary board 3, thereby ensuring that the lift cylinder 2 can drive the lifting frame 8 and the conveyor chains 22 to smoothly and synchronously move up and down.

During actual use, a blank is conveyed to the blank water blowing device through the conveyor chains 22, the lift cylinder 2 lifts up the blank to an appointed position, and then, the thrust cylinder 9 starts working. The ball screw 28 is a two-way ball screw rotating leftwards and rightwards and having the positive and negative threads, so, due to the matching between the ball screw 28 and the flanges 27 fixed on the left sliding seat 12 and the right sliding seat 12, the thrust cylinder 9 drives the left sliding seat 12 and the right sliding seat 12 to perform synchronous centripetal motion along the linear guide rail 10, two powered rollers 21 and two driven rollers 26 clamp the lip of a blank wheel, and then the blank is located in high precision. The motor 16 drives two powered rollers 21 on the left side to rotate through the chain transmission of the sprocket A 13, the chains 14 and two sprockets B 15, and the two powered rollers 21 drive the blank to rotate. The air supply pipe 23 supplies compressed air, the compressed air passes through the air amplifiers 24 to form high-pressure air flows, and the high-pressure air flows blow off residual water on the blank.

The thrust cylinder 9 resets, the powered rollers 21 and the driven rollers 26 loosen the blank, the lift cylinder 2 lifts down the blank to reset, and the conveyor chains 22 carry away the water-removed blank. So far, the blank water blowing operation is completed.

The invention claimed is:
1. A blank water blowing device, comprising:
a frame, a lift cylinder, an auxiliary board, guide shafts, linear bearings, bearing seats, a mounting rack, a lifting frame, a thrust cylinder, a linear guide rail, slide rail seats, sliding seats, a sprocket A, chains, sprockets B, a motor, bases, rotating shafts, glands, bearings, powered rollers, conveyor chains, an air supply pipe, air amplifiers, a support, driven rollers, flanges, and a ball screw and mounting seats;
wherein the mounting rack, the linear guide rail, the thrust cylinder, the support and the mounting seats are fixed on the frame, and the air amplifiers are mounted on the support through the air supply pipe;
the bearing seats and the lift cylinder are fixed on the mounting rack, the guide shafts are connected with the bearing seats through the linear bearings, an output shaft of the lift cylinder is connected with the lifting frame, and the conveyor chains are mounted on the lifting frame; and
an output shaft of the thrust cylinder is connected with one of the sliding seats, the sliding seats are connected with the linear guide rail through the slide rail seats, the motor and the bases are fixed on the sliding seats, the rotating shafts are mounted on the bases through the glands and the bearings, two ends of each rotating shaft are respectively connected with a corresponding powered roller and a corresponding sprocket B, an output end of the motor is connected with the sprocket A, the sprocket A and two sprockets B are connected through the chains, the ball screw is mounted on the frame through a left mounting seat and a right mounting seat, and two flanges are respectively fixed on a left sliding seat and a right sliding seat and are meshed with the ball screw.

2. The blank water blowing device according to claim 1, wherein the lift cylinder drives the lifting frame and the conveyor chains to move up and down through the guide shafts and the linear bearings.

3. The blank water blowing device according to claim 1, wherein the motor can drive two powered rollers on a left side to rotate through chain transmission of the sprocket A, the chains and two sprockets B.

4. The blank water blowing device according to claim 1, wherein the ball screw is a two-way ball screw rotating leftwards and rightwards and having a positive and negative threads; due to a matching between the ball screw and the flanges fixed on the left sliding seat and the right sliding seat, the thrust cylinder drives the left sliding seat and the right sliding seat to perform synchronous centripetal motion or centrifugal motion along the linear guide rail, and two powered rollers and two driven rollers implement high-precision centering motion.

5. The blank water blowing device according to claim 1, wherein tail ends of four guide shafts are connected with the auxiliary board, and the lift cylinder drives the lifting frame and the conveyor chains to synchronously move up and down.

\* \* \* \* \*